Jan. 19, 1926.
H. E. VAN DORN
1,570,105
ELECTRIC COUPLING FOR RAILWAY VEHICLES
Original Filed Feb. 11, 1920   6 Sheets-Sheet 1
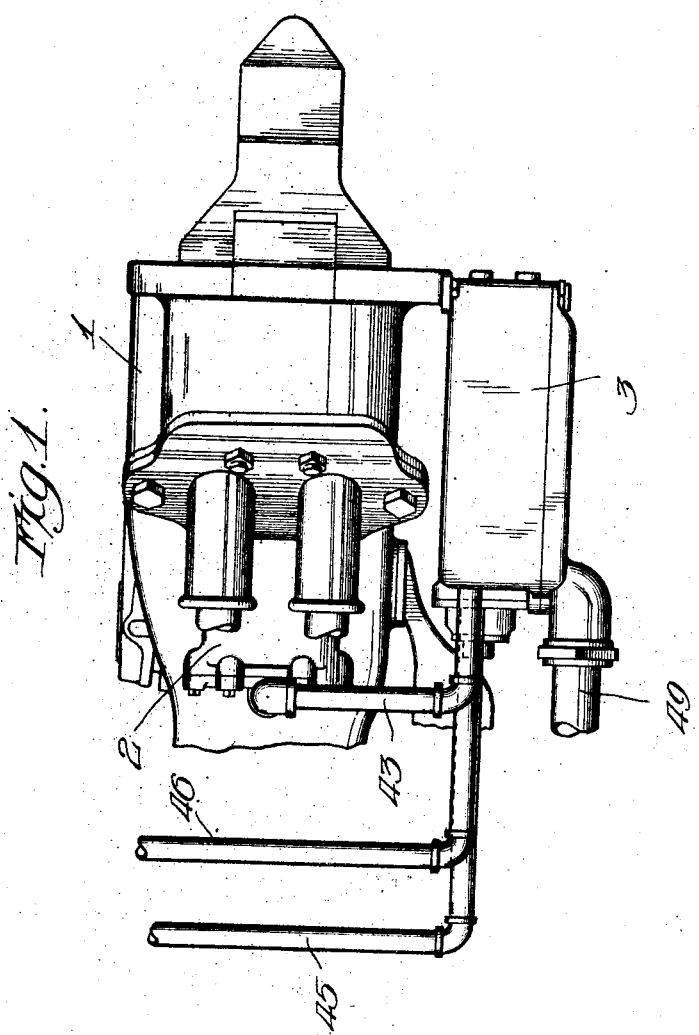
INVENTOR
Herbert E. Van Dorn
BY
Chamberlin Brendenreich
ATTORNEYS Jan. 19, 1926.  
H. E. VAN DORN  
1,570,105  
ELECTRIC COUPLING FOR RAILWAY VEHICLES  
Original Filed Feb. 11, 1920   6 Sheets-Sheet 2
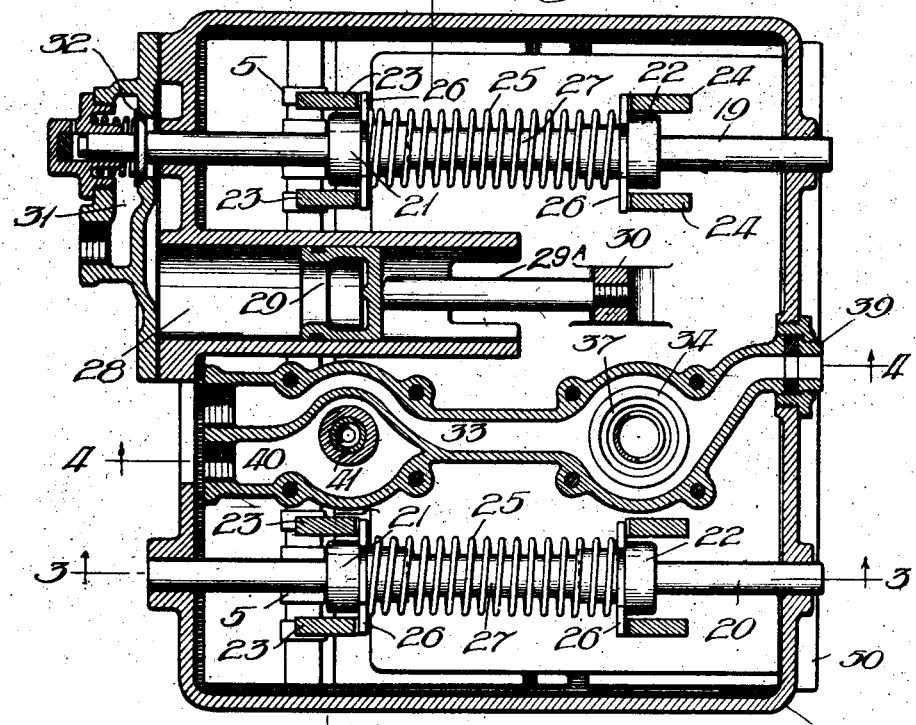
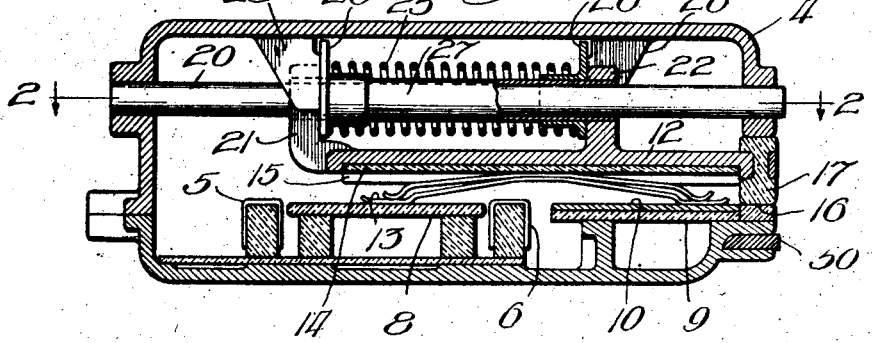
INVENTOR  
*Herbert E. Van Dorn*  
BY  
*Chamberlin & Brendenreich*  
ATTORNEYS Jan. 19, 1926. 1,570,105
H. E. VAN DORN
ELECTRIC COUPLING FOR RAILWAY VEHICLES
Original Filed Feb. 11, 1920 6 Sheets-Sheet 3
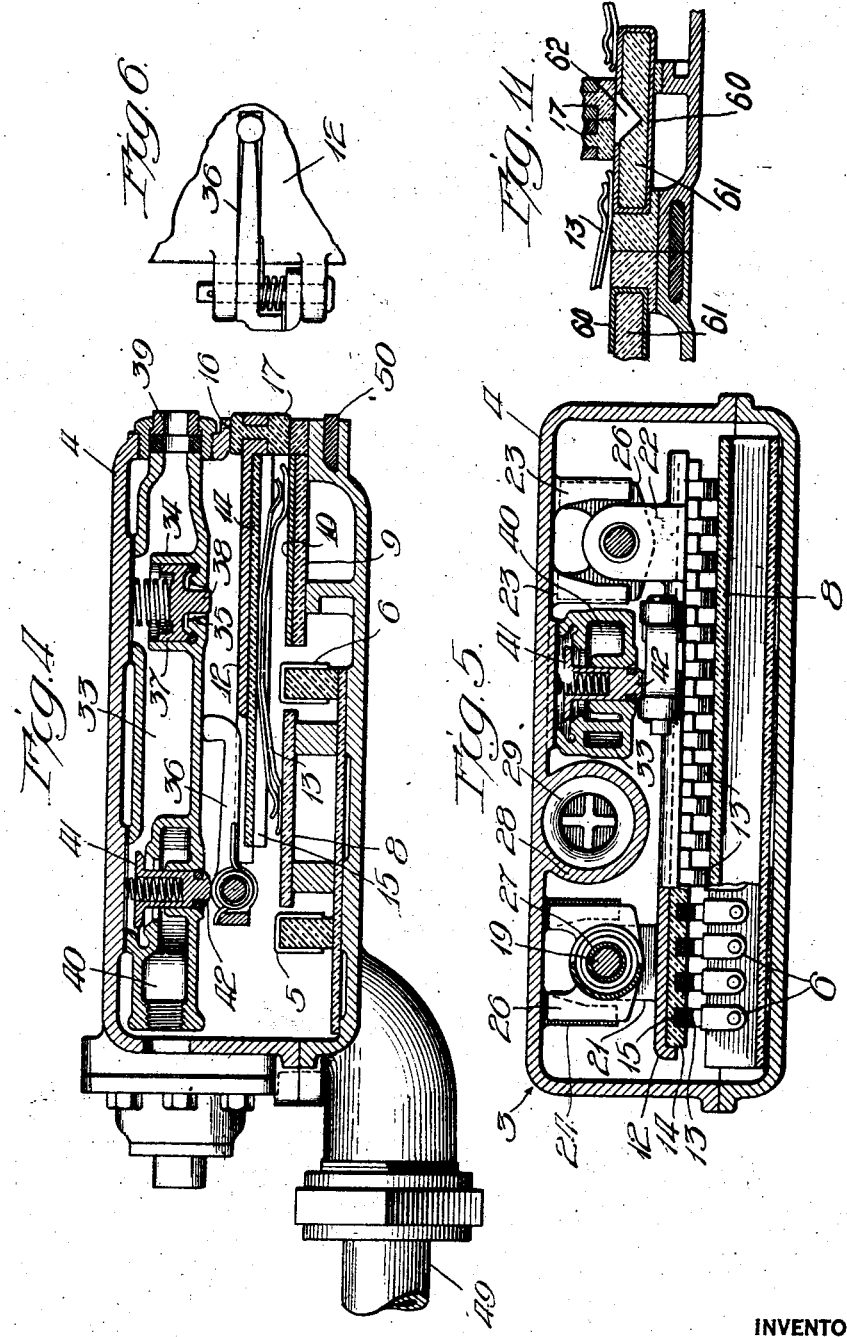
INVENTOR
Herbert E. Van Dorn
BY
Chamberlin & Brendenreid
ATTORNEYS Jan. 19, 1926.  1,570,105
H. E. VAN DORN
ELECTRIC COUPLING FOR RAILWAY VEHICLES
Original Filed Feb. 11, 1920   6 Sheets-Sheet 4
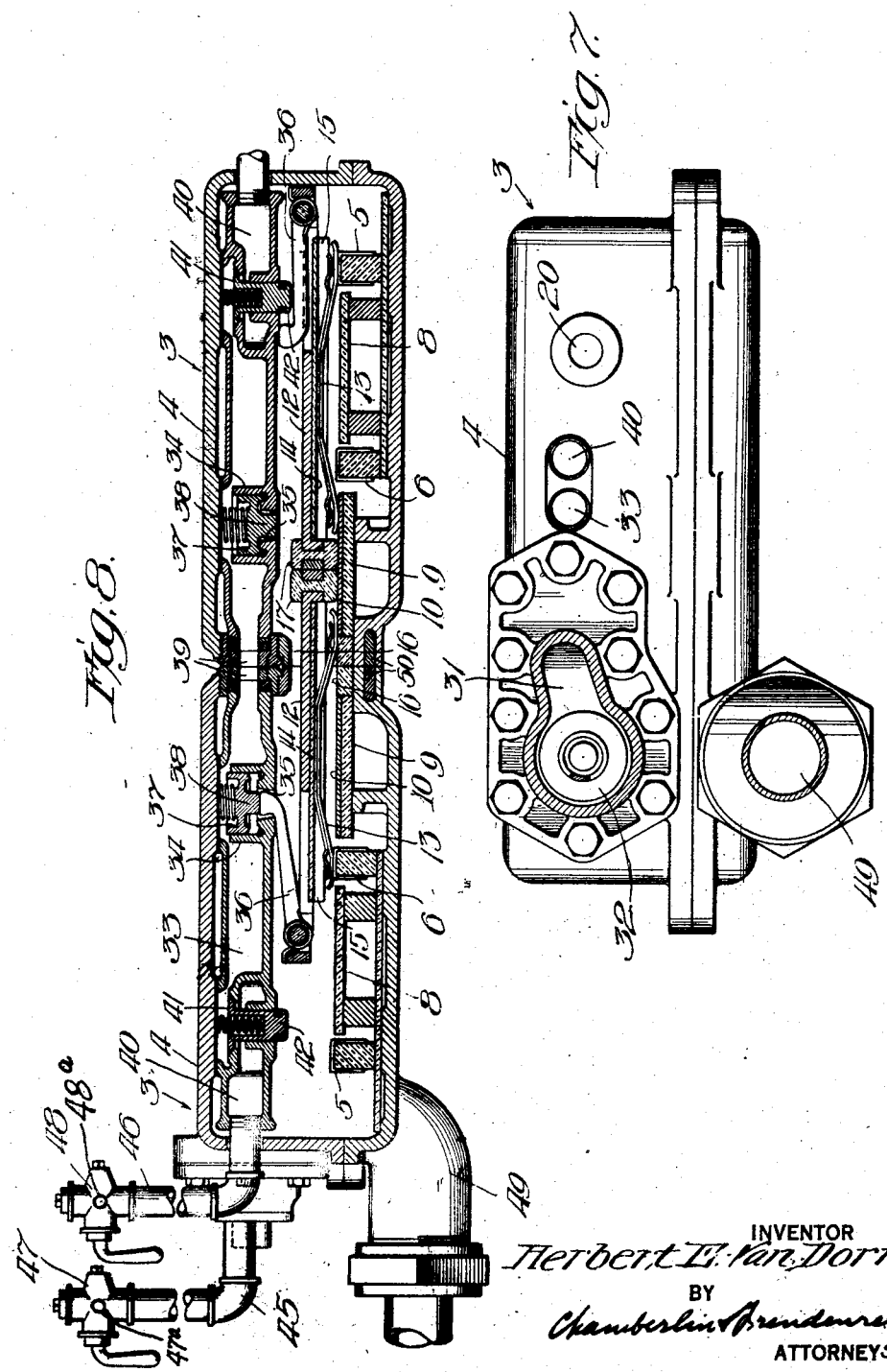
INVENTOR
Herbert E. Van Dorn
BY
Chamberlin Brendenreid
ATTORNEYS Jan. 19, 1926. 1,570,105
H. E. VAN DORN
ELECTRIC COUPLING FOR RAILWAY VEHICLES
Original Filed Feb. 11, 1920 6 Sheets-Sheet 5
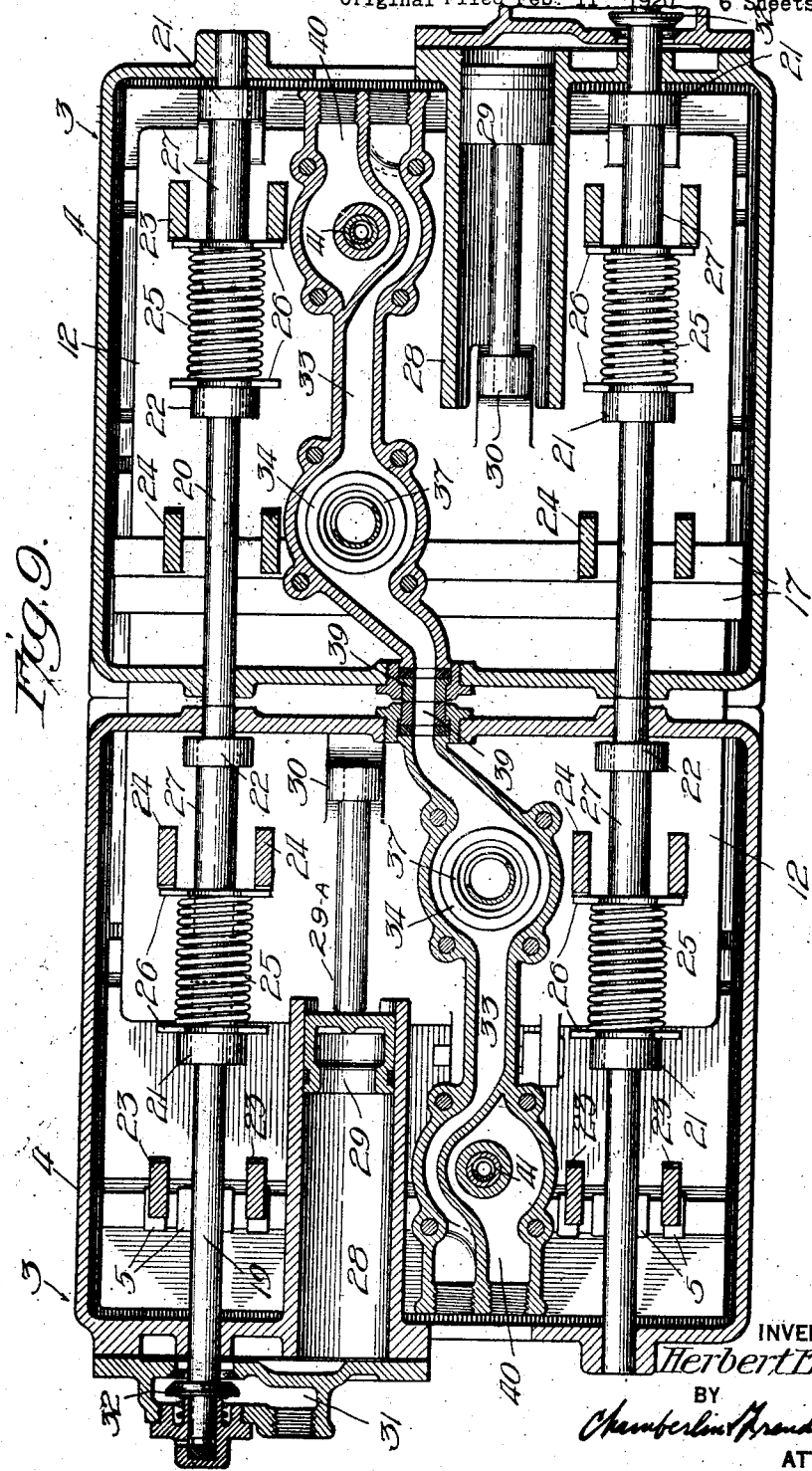
INVENTOR
Herbert E. Van Dorn
BY
ATTORNEYS

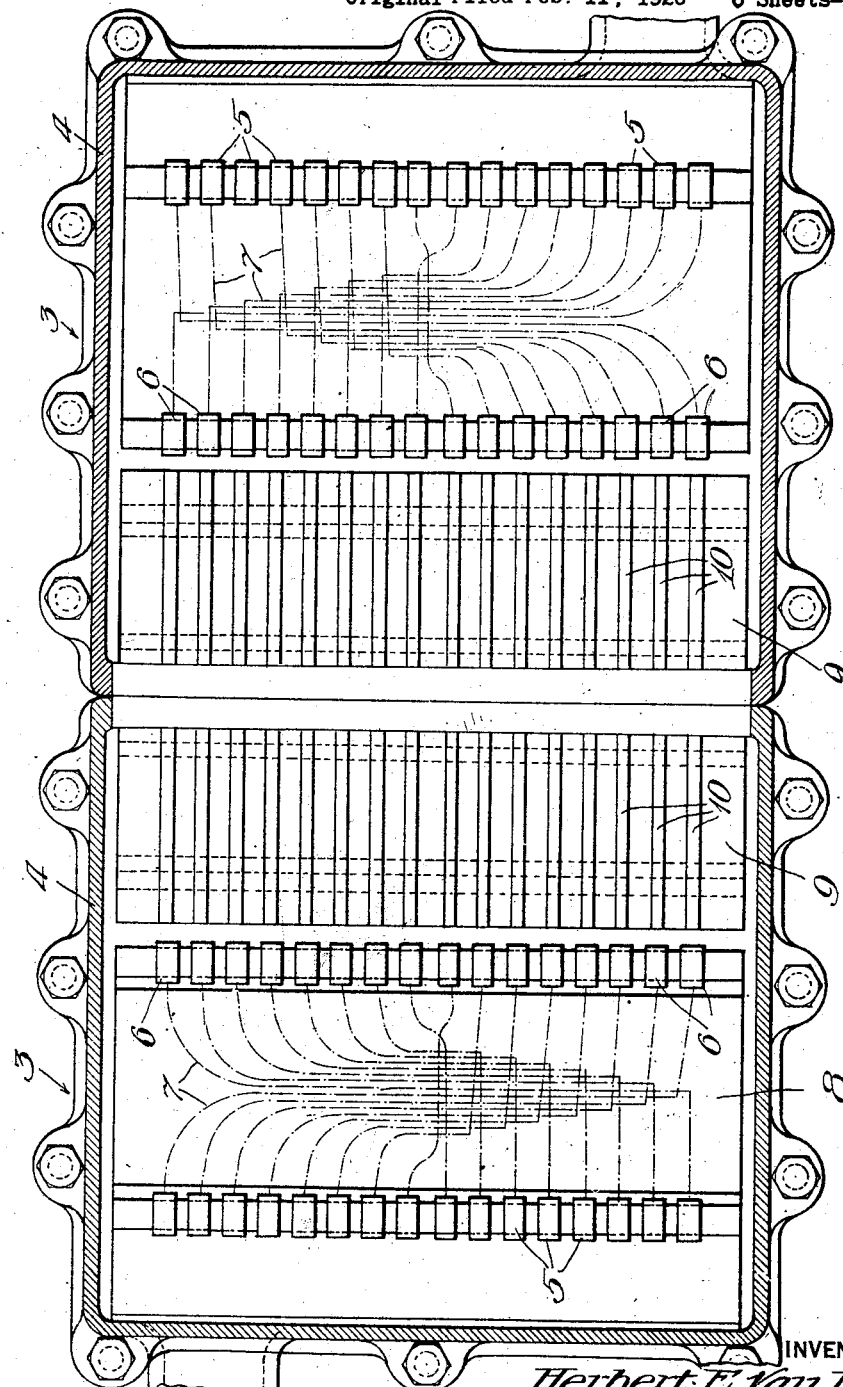

Patented Jan. 19, 1926.

1,570,105

UNITED STATES PATENT OFFICE.

HERBERT E. VAN DORN, OF CHICAGO, ILLINOIS.

ELECTRIC COUPLING FOR RAILWAY VEHICLES.

Application filed February 11, 1920, Serial No. 357,779. Renewed July 9, 1925.

*To all whom it may concern:*

Be it known that I, HERBERT E. VAN DORN, a citizen of the United States, residing at Chicago, county of Cook, State of Illinois, have invented a certain new and useful Improvement in Electric Couplings for Railway Vehicles, and declare the following to be a full, clear, and exact description of the same, such as will enable others skilled in the art to which it pertains to make and use the same, reference being had to the accompanying drawings, which form a part of this specification.

My invention has for its object to produce a simple, novel and compact device for connecting together any desired number of separate circuits on one vehicle with the corresponding circuits on another regardless of which end of either vehicle is directed toward the other vehicle.

A further object of the present invention is to produce a simple, novel and compact electric coupler which normally, when not in use, will be sealed against the entrance of dirt and water without the use of doors or the like which must be opened or removed at the time of making a coupling connection.

A further object of the present invention is to produce a simple and novel pneumatically-controlled electric coupler which will in turn control the releasing means for the corresponding car or vehicle coupler so as to prevent the latter from being released until the electric coupler is placed in the proper condition for uncoupling.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein;

Figure 1 is a side elevation of a fragment of a car coupler having attached thereto one of my improved electric couplers;

Fig. 2 is a horizontal section, on a larger scale than Fig. 1, taken through the electric coupler near the top thereof, approximately on line 2—2 of Fig. 3;

Fig. 3 is a section on line 3—3 of Fig. 2, being a vertical longitudinal section through the coupler, only those elements lying substantially in the plane of the section being shown;

Fig. 4 is a section taken approximately on line 4—4 of Fig. 2, only those elements lying substantially in the plane of the section being shown;

Fig. 5 is a section taken approximately on line 5—5 of Fig. 2;

Fig. 6 is a plan view of the locking dog for the movable element of the electric coupler, together with its immediate supporting means;

Fig. 7 is a rear end view of the coupler.

Fig. 8 is a longitudinal section on the same plane and of the same nature as Fig. 4, through two couplers in coupled relation;

Fig. 9 is a view similar to Fig. 2, showing two couplers in coupled relation as in Fig. 9;

Fig. 10 is a transverse section through a pair of couplers in a plane just above the stationary contacts; and Fig. 11 is a vertical longitudinal section through the meeting ends of two couplers containing a modification of the stationary contact strips.

Referring to Fig. 1 of the drawings, 1 represents a car coupler having an unlocking cylinder, 2; this being any usual or suitable construction in which, when air is admitted to the cylinder, the car coupler is unlocked or released. Secured underneath the car coupler is an electric coupler, 3, so positioned that when two car couplers are interlocked with each other, the two corresponding electric couplers will also be disposed in operative relation with respect to each other. Reference now being had to all of the figures of the drawings, it will be seen that each electric coupler comprises a closed casing or housing, 4, within which are located contact devices and operating mechanism therefor. The coupler may be designed to connect together any desired number of leads or terminals on one car to those on another. In the arrangement shown, as best seen in Fig. 10, provision is made for sixteen separate connections or circuits. Each coupler is therefore provided with sixteen stationary contacts, 5, extending in a row across the same and with a second set, 6, arranged in another row parallel with the first; each contact of one set being connected with the corresponding contact of the other set on the opposite side of the longitudinal axis of the coupler so that the contact on the extreme end of one row is connected to the contact on the opposite end of the other row; the cross connections being through suitable wires, 7. Between the two rows of stationary contacts is arranged a platform or table, 8, of insulating material, the table or platform being at approximately the plane of the upper faces of the stationary contacts, 5 and 6. The two rows of contacts, 5 and 6, are arranged in rear of the front end of the housing so as to provide room in the front end of the housing for a second table or platform, 9, of insulating material on which are placed a series of contact strips, 10, extending longitudinally of the coupler, one in front of each of the stationary contacts, 6.

In each casing or housing is a sliding plate, 12, provided with bow-shaped yieldable contact fingers, 13, on the under side. As best shown in Figs. 4 and 5, the plate, 12, has on the under side a layer of insulating material, 14, grooved longitudinally as indicated at 15, directly above each of the stationary contact strips, 10. Each of the grooves has a seat and a locator for one of the contact fingers. Normally, in the idle position of the coupler the contact fingers are positioned as shown in Fig. 4 namely, they rest at one end upon a table or platform, 8, of insulating material and at the other end upon the corresponding conducting strips, 10. Each of the contact-carrying plates is adapted to be projected through the front end of the corresponding coupler into a co-operating coupler as will hereinafter be described, through an elongated opening or slot, 16. This opening or slot is normally closed by means of a thickened part, 17, along the front edge of the plate, which thickened part is preferably in the form of a bar of insulating material such as rubber, said bar just filling the slot through which the plate is adapted to pass and thus closing the slot when the parts are in their normal idle positions. In order to make a coupling connection after two of the couplers have been brought together, one of the contact-carrying plates is moved outwardly and, pushing the corresponding member of the other coupler ahead of it, enters the other coupler head as shown in Fig. 9. The contact-carrying plate of either of two co-operating couplers may be moved out, it being immaterial which; for when either of the plates is moved outwardly the other is pushed inwardly thereby. In Fig. 9 the contact-carrying plate in the left hand coupler is shown projected into the interior of the housing of the right hand coupler. It will be seen that when the parts are in this condition each movable contact finger of the left hand coupler bridges the gap between one of the corresponding stationary contacts, 6, and one of the stationary contact strips, 10, in the opposite head. At the same time each movable contact finger in the right hand head extends from one of the stationary contact strips, 10, to one of the stationary contacts, 5. In other words, each stationary contact in the front row of one coupler is electrically connected with the correspondingly placed stationary contact in the rear row of the other coupler and, by reason of the cross connections between the rows of stationary contacts in each coupler, there will always be obtained the proper connection between each circuit on one car or vehicle and the corresponding circuit on the other car or vehicle.

The means for supporting the contact-carrying plate are perhaps best shown in Figs. 2, 3 and 5. Referring to these figures it will be seen that supported in the housing above the plate are two parallel rods, 19 and 20, arranged at opposite sides of the housing and extending in the longitudinal direction. The plate has four upwardly-projecting ears arranged in pairs, 21 and 22, the rod, 19, extending through one pair of ears and the rod, 20, extending through the other pair so that the rods serve as guides from which the plate is hung. The top of the casing or housing has downwardly-projecting stop lugs, arranged in pairs, 23 and 24, in the vicinity of the rods 19 and 20. The lugs, 23 and 24, of each pair are spaced apart a distance equal to the spacing between the corresponding ears, 21 and 22, on the contact-carrying plate. Surrounding each of the rods, 19 and 20, between the ears 21 and 22, is a coiled spring, 25. At the ends of the coiled springs are follower plates, 26, so proportioned that each follower plate may simultaneously engage with one of the stop lugs, 23, and the corresponding ear on the contact-carrying plate. For convenience in assembly and in taking apart the coupler for inspection or repair, I prefer to mount the follower plates, 26, of each set upon a sleeve, 27, which fits over the corresponding supporting shaft and is long enough to extend through the corresponding ears, 21 and 22. With this arrangement, whenever one of the rods, 19 or 20, is removed, the follower plates and spring are still kept in operative relation to the ears on the contact plate. The parts are so proportioned that the springs, 25, tend constantly to hold the contact plate in its idle or neutral position as illustrated in Fig. 3. Whenever the plate is moved in one direction or the other, a compression of the springs takes place so that whenever the moving force is released the springs return the plate to the neutral position. The movement of the contact-carrying plate against the tension of the springs may be effected in any suitable way. In the arrangement shown, as best illustrated in Figs. 2 and 9, there extends inwardly from the rear wall of the housing or casing a cylinder, 28, having its axis extending longitudinally of the coupler. In the cylinder is a piston, 29, loosely engaging a stem, 29ª, which is connected to an ear, 30, rising upwardly from the top of the contact-carrying plate. When air is admitted behind the piston, it drives the piston forward and the contact-carrying plate outwardly against the tension of the springs. It is desirable that the coupler be locked when not in operative relation to another coupler so that the contact-carrying plate cannot be projected outwardly except when there is another coupler to receive it. This may conveniently be accomplished by providing in the passageway, 31, through which air is supplied to the cylinder 28 a valve, 32, which is normally closed; this valve lying directly behind the rear end of the supporting rod, 19, which rod is therefore made movable in the longitudinal direction and allowed to project a short distance from the front end of the coupler. Consequently, when a coupler is in an idle condition, the valve, 32, is closed and no air can reach the actuating cylinder. However, when two couplers come together as shown in Fig. 9, the valve, 32, of each of the couplers is opened so that air may be allowed to flow into the actuating cylinder of either of the two couplers which may be selected.

It is desirable that after a coupling connection has been made it be maintained independently of the pressure in the actuating cylinder. I have therefore provided a catch which will lock the contact-carrying plate in its forwardly-projected position. This locking device is best shown in Figs. 4, 6 and 8. Extending lengthwise through the upper part of the housing is an air conduit, 33, in the bottom wall of which is an upwardly-extending cylindrical flange, 34, forming a short open top cylinder having a hole, 35, extending through the bottom thereof. On the rear end of the plate, 12, is a spring-held dog or finger, 36, held pressed upwardly against the conduit 33 and in the same longitudinal plane as the hole 35. When the plate is moved forwardly to a coupling position, the free end of the locking dog or finger rises upwardly into the hole 35 and thus serves to lock the plate against movement either in the forward direction or toward the rear. In the cylinder, 34, is a piston, 37, having on the under side a projection, 38, which normally, as shown in Fig. 4, extends downwardly through the hole 35. It will be seen that if air is admitted into the conduit 33 at a time when the piston 37 in the left hand coupler is being held up by the locking dog, the piston will be forced down, carrying the locking dog with it until the latter is entirely released and permits the springs associated with the contact-carrying plate to return the latter to is neutral position.

The conduit, 33, terminates at its front end in a suitable compressible nozzle or outlet, 39, which, when it contacts with the corresponding member on another coupler, makes an air-tight joint between the two conduits in the couplers. Therefore, when air is admitted into one of the conduits it immediately flows into the other. The air which releases the electric coupler may also be utilized to unlock the car or vehicle coupler. However, it is desirable to delay the unlocking of the car or vehicle coupler until the electric couplers have been placed in their neutral conditions. This may conveniently be accomplished by employing a branch conduit, 40, to carry air from the conduit, 33, to the unlocking cylinder of the car coupler; the supply of air to the branch conduit, 40, being under the control of the movable contact-carrying plate. In the arrangement shown, there is arranged between the conduit 33 and the branch conduit a valve, 41, which tends constantly to seat itself so as to close communication between the main conduit and the branch. The valve has a stem, 42, projecting downwardly into the path of travel of a part of the dog or catch, 36, and adapted to be engaged by the latter when the contact-carrying plate is in its neutral position, for the purpose of lifting the valve from its seat as illustrated in Figs. 4 and 5. Therefore, whenever the contact-carrying plate is in its neutral position, air may flow into the branch conduit, 41, and from there through a suitable pipe such as indicated at 43 in Fig. 1, to the unlocking cylinder, 2, of the car or vehicle coupler. Whenever two of the electrical couplers are in coupled relation, as illustrated in Fig. 9, the forward movement of one of the contact-carrying plates carries the corresponding dog forwardly of the corresponding valve stem, 42, while the dog in the other coupler is carried rearwardly so as to leave the corresponding valve free to close. When the parts are in this position, the admission of air into the conduit, 33, does not act immediately to release the car or vehicle couplers but first causes that dog which is in locking position to be released, so as to permit the contact-carrying plates to be automatically restored to their neutral positions; whereupon both of the valves 41 will be opened and air will pass to the respective car or vehicle couplers.

Air is supplied from any suitable source to the air chamber, 31, and the conduit, 33, through suitable pipes, 45 and 46, respectively, which may extend into the vestibule of or other convenient point in a car or vehicle where suitable manual controlling valves, 47 and 48, are provided. The valve, 47, should be so constructed that when it is closed, after having admitted air to the chamber 31 and the cylinder 28 and causing the piston and the contact-carrying plate to move forwardly, the said chamber and cylinder will be placed in communication with atmosphere and release the pressure in the cylinder. Therefore when the contact-carrying plate is returned to neutral by the springs when uncoupling there will be no pressure in the cylinder to oppose it. Furthermore, when the contact-carrying plate is pushed inwardly by the corresponding member of a co-operating coupler while two couplers are in contact with each other, no opposing pressure will be created in its actuating cylinder to retard the movement of the plate. The valve 47, as illustrated, is provided with a port, 47$^a$, for this purpose.

The valve, 48, also, when closed, should exhaust to atmosphere the chamber, namely the conduit 33, which it supplies with air. It is shown as having a port, 48$^a$, for this purpose. Consequently, if there is any leakage of air through the valve which might otherwise build up sufficient pressure in the conduit, 33, to effect an uncoupling, such leaking air would simply escape to atmosphere and not cause any damage.

The electrical conductors which it is the object of the electric couplers to connect may be led into the corresponding casing or housing through a suitable conduit, 49, opening into the casing or housing just in rear of the row of stationary contacts, 5. If desired, the housing may be provided, near the lower edge of the front end, with a transerse packing strip, 50, of rubber or other suitable material which, when two couplers are brought together, will engage with the corresponding strip of the other coupler and thus make a tight joint between the two which will prevent the entrance between the meeting ends of the couplers of dirt or grit thrown up from the roadbed while a train is in motion.

In case there should happen to be snow or ice on the outer end of a contact-carrying plate, 12, when it is inserted into a co-operating coupler, the water produced by the melting of the snow or ice would collect on the platform, 9, of the latter coupler and might shortcircuit the contact strips, 10, thereon. In Fig. 11 I have illustrated an arrangement adapted to avoid this objection. Instead of having simple straight contact strips resting on the top of the platform, I place the strips, 60, underneath the platform, 61, and bring the two ends up over the top; the strips being short enough that a space will be left between the ends of each. In the top of the platform, between the two groups of strip ends is formed a groove, 62, into which any water shed by the contact-carrying plates may run without danger of shortcircuiting the contact strips.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In an electric coupler, two transverse rows of stationary contacts arranged parallel with each other and at some distance apart, said stationary contacts being cross connected in the opposite order of their positions in the rows, a series of stationary contact strips equal in number to the contacts in each row, arranged longitudinally in front of the front row of stationary contacts, a contact-carrying plate having thereon a series of pairs of electrically connected contact fingers corresponding in number and disposition transversely of the coupler to said strips, the contact fingers of each pair being so positioned and proportioned that in a neutral position of the plate the front finger rests on one of said strips and the rear finger lies between the two rows of stationary contacts while in a second position of the plate the rearmost contact finger engages with one of the stationary contacts in the rear row and the forward contact finger engages with the corresponding contact strip, while in a third position of the plate the rearmost finger of each pair rests upon one of the stationary contacts of the front row and the front finger projects far enough beyond the front end of said housing to engage with one of the contact strips in a co-operating coupler lying in coupling relation thereto.

2. In an electric coupler, two transverse rows of stationary contacts arranged parallel with each other and at some distance apart, said stationary contacts being cross connected in the opposite order of their positions in the rows, a series of stationary contact strips equal in number to the contacts in each row, arranged longitudinally in front of the front row of stationary contacts, a contact-carrying plate arranged above said stationary contact members and having thereon a series of pairs of electrically connected contact fingers corresponding in number and disposition transversely of the coupler to said strips, the contact fingers of each pair being so positioned and proportioned that in a neutral position of the plate the front finger rests on one of said strips and the rear finger lies between the two rows of stationary contacts while in a second position of the plate the rearmost contact finger engages with one of the stationary contacts in the rear row and the forward contact finger engages with the corresponding contact strip, while in a third position of the plate the rearmost finger of each pair rests upon one of the stationary contacts of the front row and the front finger projects far enough beyond the front end of said housing to engage with one of the contact strips in a co-operating coupler lying in coupling relation thereto.

3. In an electric coupler, two series of stationary contacts equal in number arranged in separate parallel transverse rows, a table of insulating material lying between said rows and at approximately the same level as the plane of the tops of the stationary contacts, the contacts of one row being cross connected to those of the other row in the opposite order of their positions in the rows, a series of contact strips equal in number to the stationary contacts in each row arranged in front of said stationary contacts and extending in the longitudinal direction, each in alignment with two stationary contacts in said rows, said contact strips being in approximately the same horizontal plane as said table, a contact-carrying plate arranged above said stationary contacts and having a series of pairs of contact fingers arranged on the under side thereof, the fingers of each pair being electrically connected together and being located in the same vertical plane as one of the contact strips, and the contact faces of the fingers of each pair being spaced apart from each other in the longitudinal direction for a distance such that in a neutral position of the plate one of the fingers of each pair rests on said table and the other finger rests on one of said strips, while in a second position of said plate one of said fingers rests upon one of the stationary contacts in the rearmost row and the corresponding finger rests on one of said contact strips, while in the third position of said plate one of the fingers rests upon one of the contacts in the front row while the corresponding finger is projected forward far enough to engage with one of the contact strips in another coupler lying in proximity thereto.

4. In an electric coupler, two series of stationary contacts equal in number arranged in separate parallel transverse rows, a table of insulating material lying between said rows and at approximately the same level as the plane of the tops of the stationary contacts, the contacts of one row being cross connected to those of the other row in the opposite order of their positions in the rows, a series of contact strips equal in number to the stationary contacts in each row arranged in front of the stationary contacts and extending in the longitudinal direction, each in alignment with two stationary contacts in said rows, a contact-carrying plate arranged above said stationary contacts and having a series of pairs of contact fingers arranged on the under side thereof, the fingers of each pair being electrically connected together and being located in the same vertical plane as one of the contact strips, and the contact faces of the fingers of each pair being spaced apart from each other in the longitudinal direction for a distance such that in a neutral position of the plate one of the fingers of each pair rests on said table and the other finger rests on one of said strips, while in a second position of said plate one of said fingers rests upon one of the stationary contacts in the rearmost row and the corresponding finger rests on one of said contact strips, while in the third position of said plate one of the fingers rests upon one of the contacts in the front row while the corresponding finger is projected forward far enough to engage with one of the contact strips in another coupler lying in proximity thereto.

In testimony whereof, I sign this specification.

HERBERT E. VAN DORN.